United States Patent [19]

Kilian et al.

[11] Patent Number: 5,072,803
[45] Date of Patent: Dec. 17, 1991

[54] METHOD OF SETTING AN ASSISTING FORCE IN POWER-ASSISTED STEERING

[75] Inventors: Ulrich Kilian, D-Albershausen; Jürgen Götz, Lorch; Claus-Michael Hainbuch, Weinstadt; Berthold Edenhofer, Ebersbach/Fils, all of Fed. Rep. of Germany

[73] Assignee: Daimler-Benz AG, Fed. Rep. of Germany

[21] Appl. No.: 550,090

[22] Filed: Jul. 9, 1990

[30] Foreign Application Priority Data

Jul. 8, 1989 [DE] Fed. Rep. of Germany ....... 3922527

[51] Int. Cl.$^5$ ............................................. B62D 5/06
[52] U.S. Cl. ..................................... 180/141; 180/79.1
[58] Field of Search ...................... 180/141, 142, 79.1; 364/424.05, 424.1

[56] References Cited

U.S. PATENT DOCUMENTS

| 4,541,499 | 9/1985 | Yanai et al. | 180/142 |
| 4,593,358 | 6/1986 | Takeshima et al. | 180/142 |
| 4,681,181 | 7/1987 | Shimuzu | 180/79.1 |
| 4,834,203 | 5/1989 | Takehashi et al. | 180/79.1 |
| 4,875,540 | 10/1989 | Oshita et al. | 180/142 X |
| 4,880,074 | 11/1989 | Matsumoto | 180/142 |
| 4,909,343 | 3/1990 | Mouri et al. | 180/142 |
| 4,926,960 | 5/1990 | Ishikura et al. | 180/142 X |

Primary Examiner—Charles A. Marmor
Assistant Examiner—Kevin Hurley
Attorney, Agent, or Firm—Evenson, Wands, Edwards, Lenahan & McKeown

[57] ABSTRACT

A power-assisted steering method establishes or sets an auxiliary force by taking into account a plurality of variables such as transverse acceleration and vehicle speed characterizing the instantaneous driving conditions. The driving feel with regard to the state of the road surface and the instantaneous driving situation for the vehicle driver are thereby ensured.

36 Claims, 2 Drawing Sheets

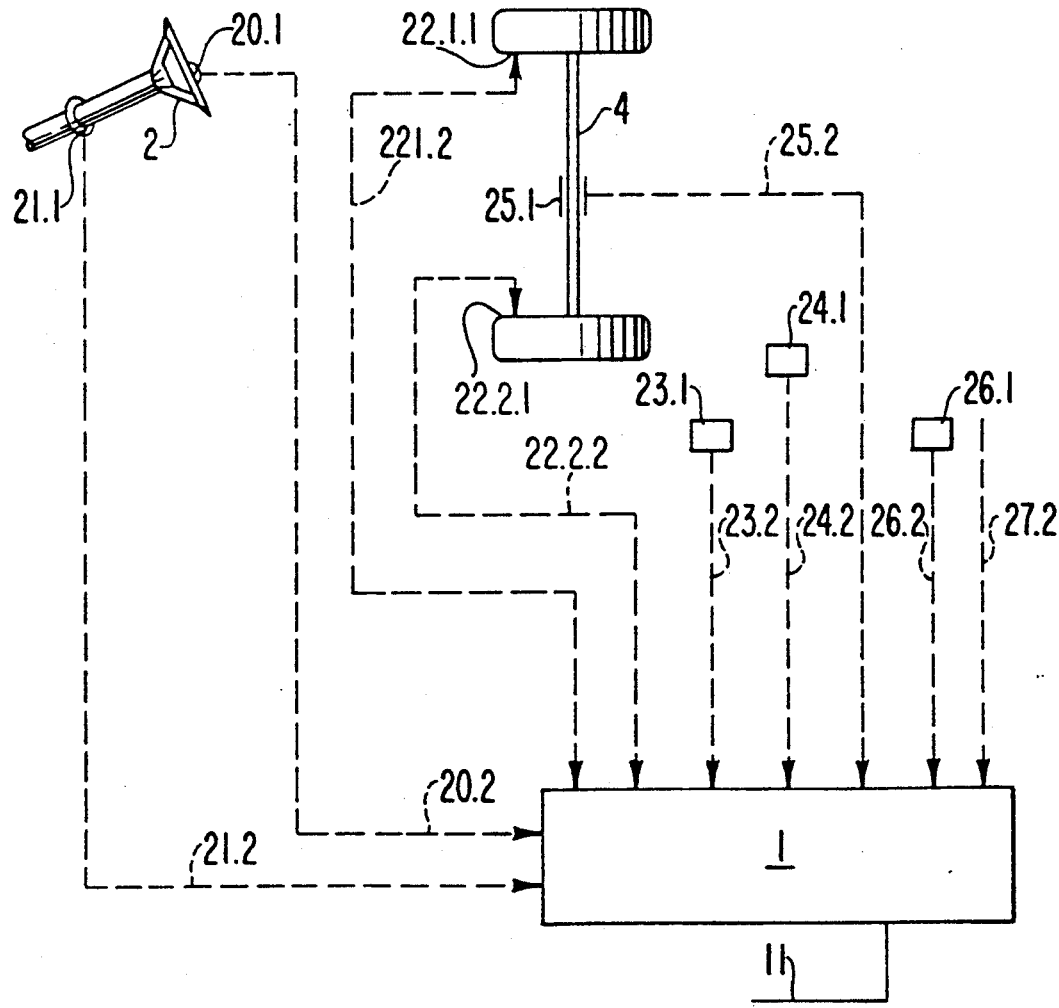

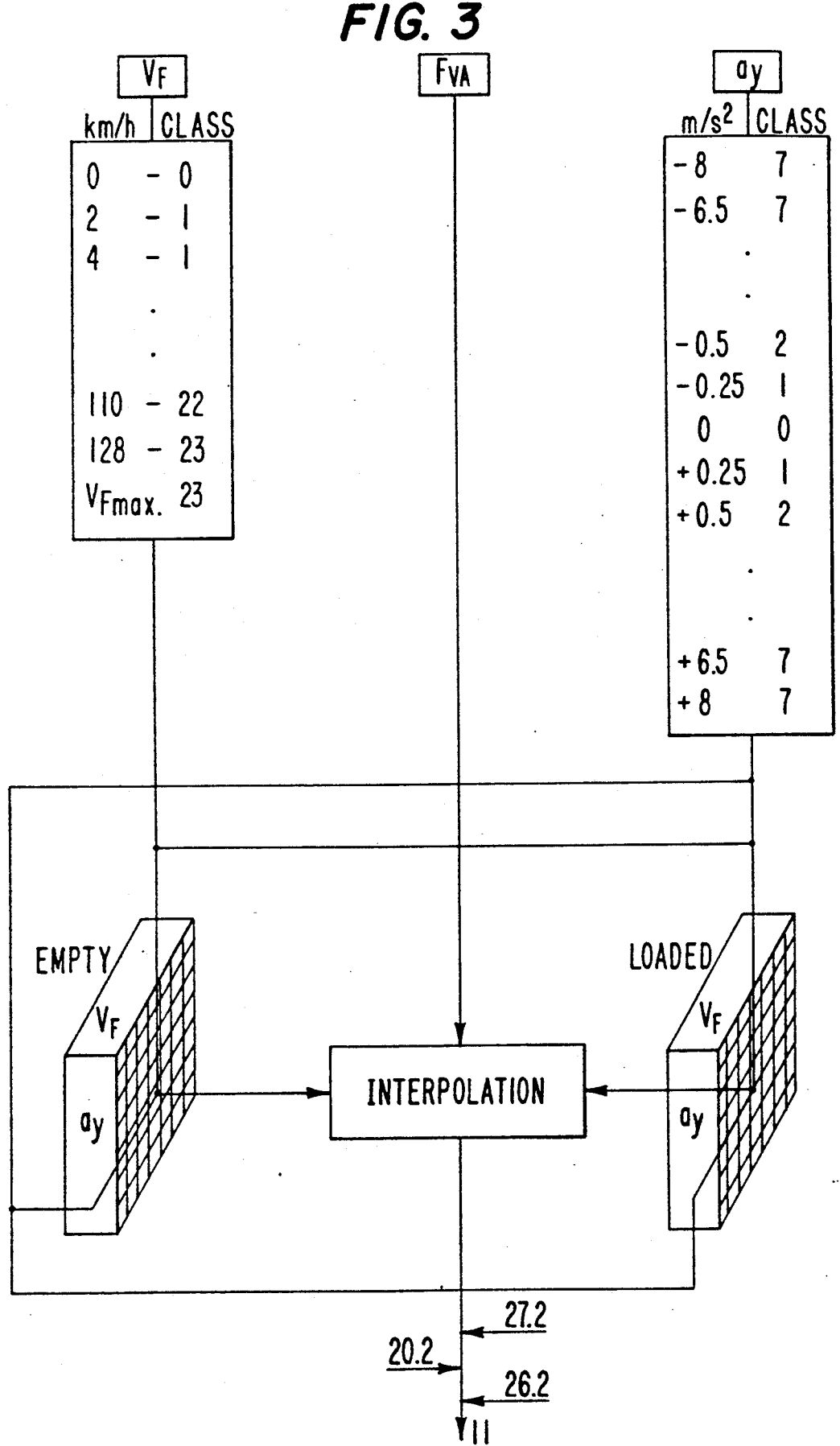

METHOD OF SETTING AN ASSISTING FORCE IN POWER-ASSISTED STEERING

BACKGROUND AND SUMMARY OF THE INVENTION

The present invention relates to a method of setting or establishing an assisting or auxiliary force in power-assisted steering as a function of a plurality of driving-condition parameters such as transverse acceleration and vehicle speed.

In a known assisting force method as shown in Japanese Preliminary Published Specification 51-149,632, the manual torque to be applied by the vehicle driver during a steering action is increased as transverse acceleration increases and as vehicle speed increases. The effect of the transverse acceleration and vehicle speed variable on the change in the manual torque to be applied is non-interacting. In other words, the extent of the increase in the manual torque to be applied as vehicle speed increases is independent of the magnitude of the transverse acceleration, and the extent of the increase in the manual torque to be applied as transverse acceleration increases is independent of the magnitude of the vehicle speed.

Such known method may be disadvantageous in that, from the increase in the manual torque to be applied as vehicle speed increases, no direct information is available to the vehicle driver as to whether the vehicle is in or close to a critical state. The same also applies to the increase in the manual torque to be applied as transverse acceleration increases.

In addition, another known method disclosed in DE-2,834,283 A1, varies the assisting force in the power-assisted steering as a function of the transverse acceleration in such a way that no assisting force appears in the power-assisted steering if the transverse acceleration exceeds a certain limit value. This assisting force is here cut off abruptly when the limit value is reached.

A disadvantageous effect in this method is that the vehicle driver can be forced into panic reactions by the sudden change in the force which can be felt at the steering wheel. In addition, as transverse acceleration increases, the force which can be felt at the steering wheel in a vehicle without power-assisted steering clearly drops when the transversely dynamic limit region is met. If, in this method, there is now a large assisting force in the power-assisted steering before the vehicle reaches the threshold value of the transverse acceleration, the effect just described for a vehicle without power-assisted steering is reversed. If the full force of the steering then reacts upon the steering wheel, since the assisting force has been removed, a greater force will be felt by the vehicle driver as a function of the size of the previously assisted force. For a moment, the vehicle driver will be surprised by the greater force, and the steering of the vehicle will be set back until the vehicle driver reacts in a compensating manner, i.e., the steering angle will be reduced and the vehicle will be unintentionally steered in a direction out of the bend. This encourages instability, which occurs anyway, of the driving behavior of a vehicle when the transversely dynamic limit region is reached, at which point the vehicle slides, via the wheels, out of the bend.

Furthermore, it is known from DE-3,424,826 A1 and De-3,504,561 A1 to deduce a general driving state with the use of suitable variables by taking an average. In particular, a distinction is to be made between driving in town, driving on the motorway, driving on an ordinary road and driving on a mountain road, and in particular driving on a winding road. The vehicle speed and the steering angle are used as characteristic variables. A load sensor is also used. The general driving state is determined from these variables by taking the average. For this driving state, a corresponding assisting force is set in the power-assisted steering.

In the method disclosed in the two last-mentioned publications, a disadvantage arises because adaption of the assisting force in the power-assisted steering to the existing instantaneous driving conditions might take place too late. In addition, the subdivision with regard to the driving conditions is only very rough, since the instantaneous driving situation is adapted to that driving condition to whose parameters it is nearest.

In addition, it is generally known in power-assisted steering systems to reduce the assisting force in a power-assisted steering as vehicle speed increases so that the vehicle driver is given considerable assistance (maneuvering) in the region of low vehicle speeds and has a more direct contact with the roadway as vehicle speed increases.

An object of the invention is, therefore, to vary an assisting force in the steering in such a way that the force to be applied by the vehicle driver during steering assumes such an amount that a critical driving state can be estimated, and a suitable assisting force in the steering is immediately made available to the vehicle driver under the instantaneous driving conditions.

This object has been achieved by providing a method of setting an assisting force in a power-assisted steering as a function of a plurality of instantaneous driving-condition parameters, such that at a transverse acceleration, $a_{y2}$, a greater reduction in the power-assisted steering, as vehicle speed, $v_F$, increases, is effected than at a transverse acceleration, $a_{y1}$, where $a_{y1} < a_{y2}$.

A significant advantage of the present invention is that the vehicle driver obtains a better feel for the particular driving situation. In addition, a more accurate setting of the assisting force in the power-assisted steering as a function of the driving conditions is possible, since allocation to a few discrete driving conditions is not carried out, but a discretization is effected in the form of subdivisions with regard to at least one variable which characterizes the driving conditions and which, if need be, is supplemented by an interpolation between these discrete values.

The driving conditions are mainly characterized by two parameters, namely vehicle speed, $v_F$, and transverse acceleration, $a_y$. In the method according to the invention, the two parameters are taken into account simultaneously by the relationship between manual torque, $T_H$, and steering-gear arm torque, $T_H$, being plotted against these two parameters in a characteristic diagram. With this desired value, the assisting force is then set or established in the power-assisted steering system, which assisting force results in modulation of the manual torque, $T_H$, as a function of the driving conditions. The relationship between manual torque, $T_H$, and steering-gear arm torque, $T_L$, is here selected in such a way that a manual torque, $T_H$, which is convenient for the vehicle driver is set as a function of the driving conditions.

In the maneuvering region, a large assisting force in the power-assisted steering is to made available to the vehicle driver. The maneuvering region is recognized by the occurrence of both a low vehicle speed, $v_F$, and a low transverse acceleration, $a_y$. If the vehicle speed, $v_F$, and the transverse acceleration, $a_y$, are zero, a large assisting force in the power-assisted steering is made available to the vehicle driver, which assisting force is then reduced when the vehicle starts to move (vehicle speed, $v_F$, not 0). The desired value for the manual torque, $T_H$, then increases digressively with both the vehicle speed, $v_F$, and the transverse acceleration, $a_y$. The subdivision with regard to the vehicle speed, $v_F$, when taking into account an interval of $0 - v_{F\ MAX}$ (maximum vehicle speed), takes place advantageously by a variable configuration of a step width, e.g. the step width being at 2 km/h in the region of low vehicle speeds, $v_F$, and increasing to 20 km/h as vehicle speed, $v_F$, increases. A convenient subdivision with regard to the transverse acceleration, $a_y$, when taking into account an interval of 0–8 m/s$^2$, is obtained by the step width being about 0.25 m/s$^2$ in the region of low transverse acceleration, $a_y$, and increasing to about 1–1.5 m/s$^2$ as transverse acceleration, $a_y$, increases. About 20 to 30 speed classes and about 10 transverse-acceleration classes are therefore obtained. It is in principle also conceivable to use other step widths or other classes for the vehicle speed, $v_F$, and/or the transverse acceleration, $a_y$.

Before the transversely dynamic limit region is reached, the desired value for the manual torque, $T_H$, here has such an order of magnitude that the drop in the reactive force can clearly be recognized as an indication of the transversely dynamic limit region being reached.

In order to maintain the feel for the possible occurrence of roadway slipperiness in particular in the region of low vehicle speed, $v_F$, and low transverse acceleration, $a_y$, on account of the order of magnitude of the assisting force, the method of setting an assisting force in the power-assisted steering according to the present invention is advantageously performed in such a way that, when roadway slipperiness is recognized, the assisting force in the power-assisted steering system is reduced to an amount which corresponds to the amount at a higher vehicle speed, $v_F$, or a higher transverse acceleration, $a_y$. This reduction in the assisting force in power-assisted steering enables a vehicle driver to recognize the drop in the force when the transversely dynamic limit region is reached.

If roadway slipperiness increases, the transversely dynamic limit region is reached at decreasing transverse acceleration, $a_y$. Thus, different roadway states can be taken into account when determining the assisting force in the power-assisted steering by the assisting force being reduced as a function of the difference in the transverse acceleration, $a_y$. This reduced assisting force results, on one hand, from the transverse acceleration, $a_y$, when the transversely dynamic limit region is reached under normal roadway conditions and, on the other hand, from the transverse acceleration, $a_y$, when the transversely dynamic limit region is reached under the instantaneously determined roadway conditions.

Roadway slipperiness which occurs can also be recognized by a deviation of the force in the steering linkage when cornering from a reference value of the force in the steering linkage under optimum roadway conditions or from the appearance of signals, or their effects, from a drive-slip control (DSC) or from the appearance of signals, or their effects, from an antilock braking system (ABS). The effects of the signals associated with the ABS can be the brake pressures appearing at the individual wheels or the forces on the brake calipers or brake drums determined in a manner known per se. In addition, a possible effect of the signals from a DSC is a reduction in the engine torque, which reduction is preferably produced by the position of the throttle valve or of the control rod being manipulated. In principle, the extent of the requisite reduction in the assisting force in the power-assisted steering can be derived from any of these specified means of determining the roadway slipperiness.

Differences in the steering behavior of the vehicle which result from different loading states of the vehicle are compensated in an advantageous manner by suitably varying the assisting force in the power-assisted steering as a function of the loading state. In principle, it is possible to vary the characteristic diagram of the assisting force in the power-assisted steering by a discretization with regard to the loading state of the vehicle. However, an accumulation of a large quantity of data on account of the discretization with regard to the loading state can be avoided by two characteristic diagrams of the assisting force being included in the power-assisted steering, in accordance with the "empty" and "full" loading states. The two values of the assisting force in the powerassisted steering are then selected for the instantaneous driving conditions (vehicle speed, $v_F$, and transverse acceleration, $a_y$). If the actual loading state is known, by an interpolation between these two values of the assisting force in the power-assisted steering, an assisting force can be controlled in such a way that a steering behavior appears on the vehicle which is independent of the actual loading state. This interpolation between the two extreme loading states can be performed as a linear interpolation.

It is also possible, in preliminary tests, to experimentally determine in a more accurate manner the dependency of the steering behavior on the loading state, e.g. by the discretization described above, in order to reach an improved balance with regard to loading states by a complicated profile of the assisting force in the power-assisted steering being approximated by a suitable function. The parameters of this function are determined in a manner known per se, for example by the method of parameter identification. The actual loading state can here be determined by measuring the weight, $F_{VA}$, on the steered axle, which weight, $F_{VA}$, is determined by wire strain gauges or, in vehicles having air suspension, by measuring the pressure of the air spring. With this method, the loading, which has an influence on the steering behavior of the vehicle, is taken into account when the method according to the present invention is performed. For example, a change in the steering behavior when driving downhill (greater weight on the steered axle) and when driving uphill (less weight on the steered axle) is also taken into account here.

Furthermore, the height of the center of gravity can in principle be take into account when determining the requisite assisting force in the power-assisted steering. An increasing height of the center of gravity during cornering causes the weight to be displaced towards the outside of the bend. This necessitates a greater skew angle; in other words, the force reacting on the steering wheel assumes its maximum value at a low transverse acceleration, $a_y$.

It is also possible to measure the height of the center of gravity during driving and to derive from this measured variable a change in the assisting force in the power-assisted steering in such a way that the drop in the force reacting on the steering wheel can be recognized by the vehicle driver when the transversely dynamic limit region is reached, i.e. that the assisting force in the power-assisted steering is reduced as the height of center gravity increases. The determination of the height of the center of gravity during driving can be dispensed with if the assisting force in the power-assisted steering definitely does not exceed such an amount that, under all relevant loading states, the drop in the reacting force on the steering wheel, when the transversely dynamic limit region is reached, can be recognized by the vehicle drive under all roadway states.

If the angle of the steering wheel is recorded in the vehicle, the angular velocity of the steering wheel can be obtained therefrom by differentiation. From a high angular velocity of the steering wheel, a situation can then be deduced which, for example, in a danger situation, requires an increasing assisting force in the power-assisted steering. This increase in the assisting force in the power-assisted steering can here increase linearly with the angular velocity of the steering wheel; in another embodiment, the increase in the steering force in the power-assisted steering can increase progressively with the angular velocity of the steering wheel.

A functional check on power-assisted steering can be carried out by measuring the manual torque, $T_H$, to be applied to the steering wheel by the vehicle driver (for example by the torsional moment in the steering column tube) and comparing the manual torque, $T_H$, with the desired value for the manual torque, $T_H$, which desired value corresponds to the driving conditions. In the event of a defect in the power-assisted steering, a deviation occurs between the measured manual torque, $T_H$, and the desired value.

BRIEF DESCRIPTION OF THE DRAWINGS

These and other features, objects and advantages of the present invention will become more apparent from the following detailed description of a presently preferred embodiment when taken in conjunction with the accompanying drawings wherein:

FIG. 1 is a contemplated desired profile diagram for the manual torque, $T_H$, as a function of parameters which characterize the driving conditions;

FIG. 2 is a functional block diagram for performing the method of the present invention; and FIG. 3 shows a sequence diagram of the method for determining the assisting force in the power-assisted steering.

DETAILED DESCRIPTION OF THE DRAWINGS

As shown in FIG. 1, the vehicle drive has to apply only a slight manual torque, $T_H$, in the maneuvering region in order to effect a maximum angle of turn. As vehicle speed, $v_F$, and transverse acceleration, $a_y$, increase, the manual torque, $T_H$, to be applied by the vehicle driver increases so that a feel for the roadway surface is provided as a function of the driving condition. The manual torque, $T_H$, has a profile such that feedback of the drop in the manual torque, $T_H$, is ensured when the transversely dynamic limit region is reached.

The point at which the transversely dynamic limit region is reached as a function of the operating conditions of the vehicle is here essentially influenced by the nature of the roadway surface, the height of the center of gravity, the vehicle speed, $V_F$, the transverse acceleration, $a_y$, and the total loading of the vehicle. The desired profile of the manual torque, $T_H$, is conveniently selected in such a way that recognition of the transversely dynamic limit region at a variable height of the center of gravity is generally ensured. The other specified variables have a greater effect on the recognition of the transversely dynamic limit region. Therefore these variables are advantageously recorded separately and taken into account when determining the assisting force in the power-assisted steering. The relationship between manual torque, $T_H$, and steering-gear arm torque, $T_L$, is established in accordance with this desired profile for the manual torque, $T_H$.

FIG. 2 shows a functional block diagram of the system for performing the method according to the present invention. On the basis of the measured variables, an output signal 11 is generated in the control unit 1. The output signal 11 brings about a change in the assisting force in the power-assisted steering. Sensors 20.1 and 21.1 record the angle of the steering wheel and the manual torque, $T_H$, and, can be attached to the steering wheel 2. These measured variables are fed to the control unit 1 via the signal lines 20.2 and 21.2.

When the signal 21.2 for the manual torque, $T_H$, is processed in the control unit 1, a functional check on the power-assisted steering can be realized by the measured manual torque, $T_H$ (signal line 21.2), being compared in the control unit 1 with the manual torque which, on the basis of the output signal 11, should appear as a function of the other input variables. When the signal 20.2 for the angle of the steering wheel is processed in the control unit 1, a situation can be recognized in which an increasing assisting force is required in the power-assisting steering. Here, the angle of the steering wheel is differentiated according to time in the control unit 1. A need for an increasing assisting force in the power-assisted steering is then determined from a high angular velocity of the steering wheel. This situation can occur, for example, if the vehicle driver, as a result of a skidding movement of the vehicle, has to steer sharply in the opposite direction.

When the method according to the present invention is performed, the vehicle speed, $v_F$, has to be taken in account and can be obtained, for example, by the signals from wheel-speed sensors 22.1.1 and 22.2.1 being fed via signal lines 22.1.2 and 22.2.2 to the control unit 1. In addition, the transverse acceleration, $a_y$, of the vehicle can be derived from the wheelspeed signals 22.1.2 and 22.2.2. The vehicle speed, $v_F$, can alternatively be measured by a sensor 23.1 known per se whose signal is fed via the line 23.2 to the control unit 1. Likewise, the transverse acceleration, $a_y$, can be recorded via a separate sensor 24.1 whose signal is then fed via the line 24.2 to the control unit 1.

To take into account the loading state, the load is measured by a load sensor 25.1 whose signal is fed via the line 25.2 to the control unit 1. This load sensor 25.1 is preferably attached to the steered axle 4. This load sensor 25.1 can comprise wire strain gauges. In a vehicle having compressed-air suspension, the load can also be determined by measuring the pressure in the suspension system. The signals to the components of the suspension system which control the pressure can also be used. In addition, a signal 26.2 can be fed to the control unit to enable the height of the center of gravity measured by a sensor 26.1 to be taken into account when the method according to the present invention is performed. However, the height of the center of gravity is here more conveniently taken into account when the characteristic diagram is prepared so that sensing of the height of the center of gravity during driving is unnecessary. In addition, the state of the roadway surface, namely slipperiness, can be taken into account if the signal 27.2 is fed to the control unit 1. Slipperiness can be recognized by a deviation of a force in the steering linkage from a reference force under the same driving conditions on an established optimum roadway surface. Alternatively, roadway slipperiness can be recognized if an anti-locking system or drive-slip control transmit output signals.

The sequence of the method for determining the assisting force in the power-assisting force in the power-assisted steering is shown in FIG. 3. The vehicle speed, $v_F$, and the transverse acceleration, $a_y$, are in each case split up into certain classes or divisions. For these classes, in each case a value is selected from two families of characteristics in accordance with the "empty" and "loaded" loading states, and these values represent the assisting force in the power-assisted steering as a function of the "empty" and "loaded" loading states. In accordance with the actual loading state, an interpolation is carried out between these two values. Consequently, an output signal 11 is then obtained which corresponds to the actual loading state. This output signal 11 can be influenced in such a way that, as road slipperiness (signal 27.2) increases and the height of the center of gravity (signal 26.2) increases, a reduction in the assisting force in the power-assisted steering is controlled as function of the vehicle speed, $v_F$, and the transverse acceleration, $a_y$, so that the point at which the transversely dynamic limit region is reached can still be felt by the vehicle driver. In an advantageous manner, the angular velocity of the steering wheel (derivation from signal 20.2) is taken into account by controlling a greater assisting force in he power-assisted steering as the angular velocity of the steering wheel increases.

An exemplary presently preferred embodiment of the method of setting an assisting force in a power-assisted steering as a unction of a plurality of driving-condition parameters is now described. First, the corresponding classes are allocated to the measured vehicle speed, $v_F$, and the measured transverse acceleration, $a_y$. In accordance with these classes, the output signals are selected from the two families of characteristics in accordance with the values of the loading states, "empty" and "full". A linear interpolation is then carried out between these two values in accordance with the loading state actually measured. If, for example, from a difference between a force measured in the steering linkage and reference force at optimum road conditions under the same driving conditions, it is found that there is slipperiness in the road, the output signal is changed in such a way that a lower assisting force is set in the power-assisted steering. In the example just described, the assisting force in the power-assisted steering can be reduced in proportion to the difference between the force measured in the steering linkage and the reference force. It is also within the contemplation of the present invention to take into account the height of the center of gravity by reducing the assisting force in the power-assisted steering as the height of the center of gravity increase. This reduction can be effected in proportion to the height of the center of gravity. Furthermore, an increase in the assisting force with the angular velocity of the steering wheel is convenient. This increase can be effected in proportion to the angular velocity of the steering wheel.

If the angle of the steering wheel is recorded in the vehicle, the angular velocity of the steering wheel can be obtained therefrom by differentiation. From a high angular velocity of the steering wheel, a situation can then be deduced which, for example, in a danger situation, requires an increasing assisting force in the power-assisted steering. This increase in the assisting force in the power-assisted steering can here increase linearly with the angular velocity of the steering wheel; in another embodiment, the increase in the steering force in the power-assisted steering can increase progressively with the angular velocity of the steering wheel.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A method for setting an assisting force in a power-assisted steering as a function of actual measured drivingcondition parameters, comprising the steps of
   deriving a desired value for a manual torque to be applied to a steering wheel by a vehicle driver from the actual measured driving-condition parameters, one of the drivingcondition parameters being an actual measured value of transverse acceleration, and a further driving-condition parameter being an actual measured value of vehicle speed,
   setting the assisting force on an at least approximately continuous basis in the power-assisted steering such that the manual torque and the assisting force, on the basis of the actual measured driving condition parameters, are precisely compensated with steering forces to control the desired value;
   a least approximately continuously reducing the assisting force in the power-assisted steering as a result of both increasing actual measured values of the transverse acceleration and increasing actual measured values of the vehicle speed; and
   effecting a greater reduction, at desired transverse acceleration, in the assisting force as the vehicle speed increases, than at another lower transverse acceleration.

2. The method according to claim 1, wherein at a certain vehicle speed, a greater reduction in the assisting force, as the transverse acceleration increases, is effected than at a lower vehicle speed.

3. The method according to claim 1, wherein the reduction in the assisting force relative to a change in the vehicle speed in a region of low vehicle speeds is a greater amount than at higher vehicle speeds.

4. The method according to claim 3, wherein at a certain vehicle speed, a greater reduction in the assisting force, as the transverse acceleration increases, is effected than at a lower vehicle speed.

5. The method according to claim 1, wherein when a dynamic limit is reached the reduction in the assisting force relative to a change in the transverse acceleration in a region of low transverse acceleration is a greater amount than at higher transverse acceleration.

6. The method according to claim 5, wherein at a certain vehicle speed, a greater reduction in the assisting force, as the transverse acceleration increases, is effected than at a lower vehicle speed.

7. The method according to claim 6, wherein the reduction in the assisting force relative to a change in the vehicle speed in a region of low vehicle speeds is a greater amount than at higher vehicle speeds.

8. The method according to claim 1, wherein the assisting force is reduced when the driving conditions approach a transversely dynamic limit region, such that the vehicle driver has to apply the manual torque of sufficient amount to the steering wheel so that a drop in the manual torque, when the transversely dynamic limit region is reached, can clearly be sensed by the driver.

9. The method according to claim 8, wherein at a certain vehicle speed, a greater reduction in the assisting force, as the transverse acceleration increases, is effected than at a lower vehicle speed.

10. The method according to claim 9, wherein the reduction in the assisting force relative to a change in the vehicle speed in a region of low vehicle speeds is a greater amount than at higher vehicle speeds.

11. The method according to claim 9, wherein when a dynamic limit is reached the reduction in the assisting force relative to a change in the transverse acceleration in a region of low transverse acceleration is a greater amount than at higher transverse acceleration.

12. The method according to claim 1, wherein the assisting force is reduced, when roadway slipperiness is determined as a function of the roadway slipperiness such that the vehicle driver can recognize the point at which a transversely dynamic limit region is reached by a drop in the manual torque.

13. The method according to claim 12, wherein at a certain vehicle speed, a greater reduction in the assisting force, as the transverse acceleration increases, is effected than at a lower vehicle speed.

14. The method according to claim 13, wherein the reduction in the assisting force relative to a change in the vehicle speed in a region of low vehicle speeds is a greater amount than at higher vehicle speeds.

15. The method according to claim 14, wherein when a dynamic limit is reached the reduction in the assisting force relative to a change in the transverse acceleration in a region of low transverse acceleration is a greater amount than at higher transverse acceleration.

16. The method according to claim 15, wherein at a certain vehicle speed, a greater reduction in the assisting force, as the transverse acceleration increases, is effected than at a lower vehicle speed.

17. The method according to claim 12, wherein the step of determining the roadway slipperiness comprises at least one of the steps of
analyzing measuring signals or its effects from at least one of an antilock braking system and a drive-slip control; and
comparing a force in the steering linkage or a variable proportional to this force with a reference value under optimum static-friction conditions between a wheel and the roadway surface.

18. The method according to claim 12, further including a step of determining the dependency of the point at which the transversely dynamic limit region is reached on the measuring signal used, and deriving a quantity for the reduction of the assisting force from the used measuring signal.

19. The method according to claim 18, wherein the step of determining the roadway slipperiness comprises at least one of the steps of
analyzing measuring signals or its effects from at least one of an antilock braking system and a drive-slip control; and
comparing a force in the steering linkage or a variable proportional to this force with a reference value under optimum static-friction conditions between a wheel and the roadway surface.

20. The method according to claim 1, wherein the assisting force is reduced as a function of height of a vehicle center of gravity such that a drop in the manual torque, when a transversely dynamic limit region is reached, can clearly be sensed by the vehicle driver.

21. The method according to claim 20, wherein at a certain vehicle speed, a greater reduction in the assisting force, as the transverse acceleration increases, is effected than at a lower vehicle speed.

22. The method according to claim 21, wherein the reduction in the assisting force relative to a change in the vehicle speed in a region of low vehicle speeds is a greater amount than at higher vehicle speeds.

23. The method according to claim 22, wherein when a dynamic limit is reached the reduction in the assisting force relative to a change in the transverse acceleration in a region of low transverse acceleration is a greater amount than at higher transverse acceleration.

24. The method according to claim 23, wherein the assisting force is reduced when the driving conditions approach a transversely dynamic limit region, such that the vehicle driver has to apply the manual torque of sufficient amount to the steering wheel so that a drop in the manual torque, when the transversely dynamic limit region is reached, can clearly be sensed by the driver.

25. The method according to claim 24, wherein the assisting force is reduced, when roadway slipperiness is determined as a function of the roadway slipperiness such that the vehicle driver can recognize the point at which a transversely dynamic limit region is reached by a drop in the manual torque.

26. The method according to claim 25, wherein the step of determining the roadway slipperiness comprises at least one of the steps of
analyzing measuring signals or its effects from at least one of an antilock braking system and a drive-slip control; and
comparing a force in the steering linkage or a variable proportional to this force with a reference value under optimum static-friction conditions between a wheel and the roadway surface.

27. The method according to claim 26, further including a step of determining the dependency of the point at which the transversely dynamic limit region is reached on the measuring signal used, and deriving a quantity for the reduction of the assisting force from the used measuring signal.

28. The method according to claim 1, wherein the assisting force is higher in a maneuvering region than during a driving operation.

29. The method according to claim 28, wherein in the maneuvering region is recognizable by a low vehicle speed and a relatively low transverse acceleration.

30. The method according to claim 1, wherein a neutral steering behavior with regard to the vehicle loading can be sensed by the vehicle driver by increasing the assisting force as the vehicle loading increases.

31. The method according to claim 30, including the step of sensing weight on the steered axle to determine the vehicle loading influencing the steering behavior of the vehicle.

32. The method according to claim 30, including the step of interpolating with a monotonically increasing function to increase the assisting force as loading influencing the steering behavior of the vehicle increases.

33. The method according to claim 32, including the step of sensing weight on the steered axle to determine the vehicle loading influencing the steering behavior of the vehicle.

34. The method according to claim 32, wherein the monotonically increasing function is a straight line.

35. The method according to claim 1, including the step of taking into consideration a high angular velocity of the steering wheel in a driving situation having a need for a greater assisting force.

36. The method according to claim 1, including the step of functionally checking the power assisted steering by comparing the manual torque to be applied by the vehicle driver with a desired value of the manual torque set on the basis of a controlled assisting force.

* * * * *